March 20, 1934.  G. B. CREESY  1,951,596
PRINTING PLATE
Filed July 7, 1932
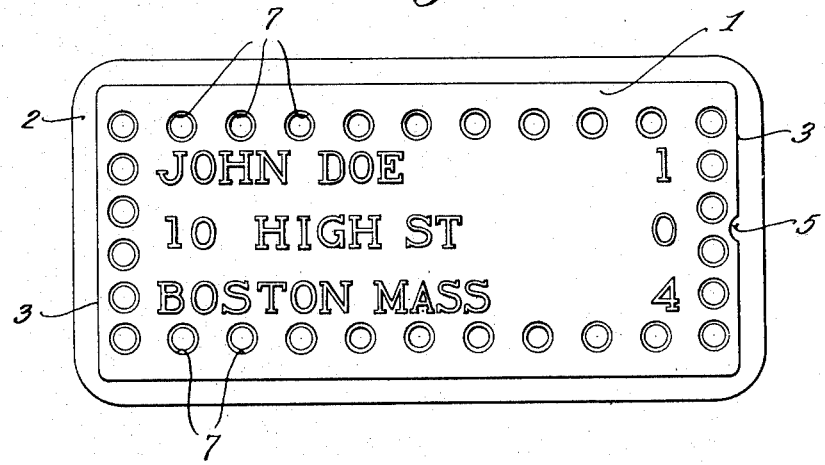
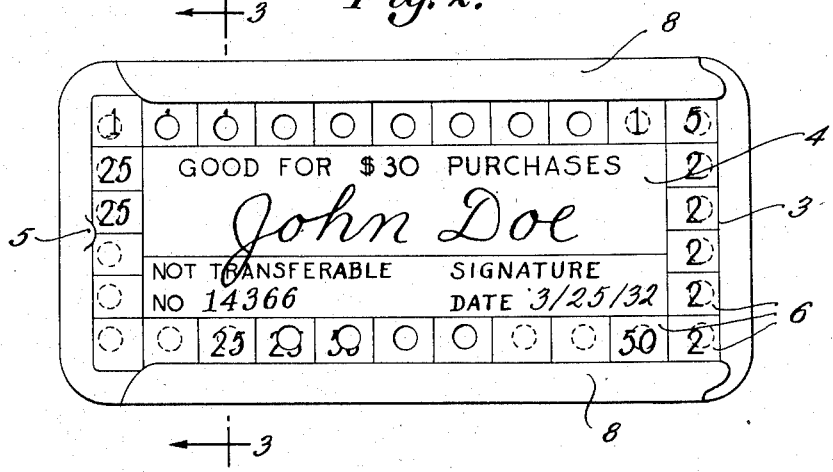
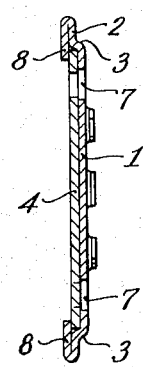
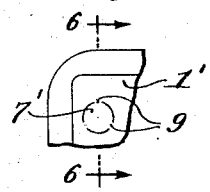
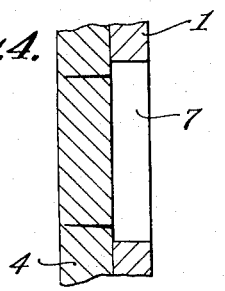
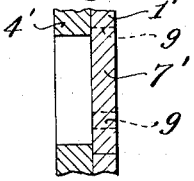
Inventor,
George B. Creesy,
by Roberts, Cushman and Woodberry
Attys.

Patented Mar. 20, 1934

1,951,596

UNITED STATES PATENT OFFICE

1,951,596

PRINTING PLATE

George B. Creesy, East Willington, Conn., assignor to Farrington Manufacturing Company, Boston Mass., a corporation of Massachusetts Application July 7, 1932, Serial No. 621,145

6 Claims. (Cl. 101—369)

This invention relates to printing plates for use as identification devices of the type disclosed in prior Patent 1,801,593, the plates being adapted for use in portable printing devices such as disclosed, for example, in Patent 1,801,592. These devices are primarily adapted for use by charge customers in department stores, gasoline stations, etc., where the plate serves not only as an identification token but also as a printing plate, the use of which by the sales clerk greatly facilitates the sales transaction and avoids errors in name and address on the sales slips.

The object of the present invention is to extend the use of such devices to new fields, particularly the field of limited credit involving the use of credit cards which are issued for small amounts upon advance payment of a portion of the amount. These cards have a series of marked spaces designating different values; for example, a card representing a total value of thirty dollars may have spaces marked five dollars, two dollars, one dollar, fifty cents and twenty-five cents, respectively. When a purchase is made spaces corresponding to the value of the purchase are punched on the card; and when the spaces are all punched further credit is withheld until the unpaid balance has been settled and another deposit made on a new card.

For the purpose of illustration a typical embodiment of the invention is shown in the accompanying drawing in which Fig. 1 is a front elevation;
Fig. 2 is a rear elevation;
Fig. 3 is a section on line 3—3 of Fig. 2;
Fig. 4 is an enlarged portion of the same section;
Fig. 5 is a detail front elevation of a modification; and
Fig. 6 is a section on line 6—6 of Fig. 5.

In the particular embodiment of the invention chosen for the purpose of illustration the plate is formed of thin sheet metal with the name, address and other indicia embossed in the central zone 1 in non-reversed order for reading from the front of the plate and for printing through the back of sales slips with carbon paper or ink ribbon in front of the sheets. At each of the four edges the plate has marginal flanges 2 and at the back it has a recess formed by bending the plate transversely to form shoulders 3 between the central zone 1 and the flanges 2. The flanges at the long edges of the plate are folded upon themselves to form lips 8 which overhang the recess as shown in Figs. 1 and 3, the lips terminating short of one end (the left end of Fig. 2) to facilitate the insertion of the card 4 which, according to the present invention, comprises the aforesaid credit card. A stab 5 is pressed from the shoulder at the end of the plate from which the card is inserted to prevent accidental displacement of the card from the plate recess.

The aforesaid marked spaces 6 are distributed along the four margins of the card 4 as shown in Fig. 2; and as shown in Fig. 1 corresponding openings 7 are formed in the central zone 1 between the shoulders 3 and the embossed characters, each of the openings 7 being opposite one of the spaces 6. To facilitate the punching of the spaces 6 through the openings 7 the spaces 6 are partially punched before the card is inserted, whereby the punchings may be completed with the point of a pencil or other pointed instrument and with very little force. As shown in the drawing the punchings are preferably somewhat smaller than the openings 7. The partial punching may be effected in various ways as by punching the card all the way through around most of the periphery of each opening, leaving one or more (say three) very narrow uncut portions at one or more locations around the periphery. However, I preferably prepunch with a completely cylindrical punch, retaining the punch in position by not cutting all the way through the card. As shown at the bottom of Fig. 3 and in Fig. 4 the prepunching is preferably from the back of the card, that is, the side presented to the bottom of the recess in the plate. This leaves the exposed face of the card uncut for very legible printing and at the same time, if the prepunching extends almost through the card, the outline is visible from the exposed side of the card to indicate where to apply the point in removing the punching in case the punching is to be removed through the aligned opening 7 in the plate. This method of removing the punchings has certain advantages over removal in the opposite direction by inserting the point through the plate opening. In the first place there is much less danger of punching the wrong space when looking at the card rather than the front of the plate; furthermore there is much less danger of the surface layer of the card peeling off and mutilating adjacent printing than in the case where the point is inserted through the plate and the punching forced out rearwardly.

From the foregoing it will be understood that in use the plate is presented in making each credit purchase, the sales clerk punches out the amount of the purchase, the sales slip or other sales record is printed with the plate in a printing device of the type disclosed in the foresaid Patent 1,801,592, and the plate is returned to the customer. When the card is completely punched a new card is purchased and substituted for the old. By mounting the credit card in the printing plate the customer has only one article to carry; this article is less likely to be mislaid, lost or broken than a card by itself; the card may easily be punched with a pencil point, thereby avoiding the use of a punch by the sales clerk; and in punching with a point there is much less danger of breaking or mutilating the card when supported by the plate as aforesaid.

It should be understood that the present disclosure is for the purpose of illustration only and that this invention includes all modifications and equivalents which fall within the scope of the appended claims. As shown in Figs. 5 and 6, for example, the openings in the plate 1' may be only partially punched leaving the punchings 7' held lightly in position by uncut portions 9, in which case the card 4' may be prepunched so that the sales clerk need remove only the punchings 7'; indeed the card 4' may be omitted entirely by marking the different values corresponding to the respective punchings on the back of the plate itself. In this case credit may be renewed either by obtaining a new plate or a new card to be inserted in the old plate.

I claim:

1. A device of the character described comprising a printing plate and a card mounted on the back thereof, the card having spaces of predetermined designation and the plate having a series of punched portions corresponding to said spaces, and also having a series of embossed printing characters on the side opposite the card in offset relation to said punched openings.

2. A printing plate for use as an identification device shaped to seat in a printing machine without attachment thereto and a card detachably mounted on the back of the plate, the card having a series of marked portions designating different values and the plate having a series of openings corresponding to said portions, and also having a series of embossed printing characters on the side opposite the card in offset relation to said punched openings.

3. A device of the character described comprising a printing plate and a card mounted on the back thereof, the card having a series of portions of predetermined designation and the plate having a series of corresponding portions, the portions of one of said series being partially punched so as to be readily removable by local pressure.

4. A device of the character described comprising a printing plate and a card mounted on the back thereof, the card having portions of predetermined designation and the plate having a series of corresponding openings, said portions being partially punched so as to be readily removable by inserting a point through the openings.

5. A printing plate for use as an identification device shaped to seat in a printing machine without attachment thereto and a card detachably mounted on the back of the plate, the card having a series of marked portions designating different values and the plate having a series of corresponding openings, said portions being partially punched so as to be readily removable by inserting a point through the openings.

6. A printing plate comprising an identification device shaped to seat in a printing machine, characterized by a series of partial punchings and associated markings representing different values.

GEORGE B. CREESY.